2,595,090

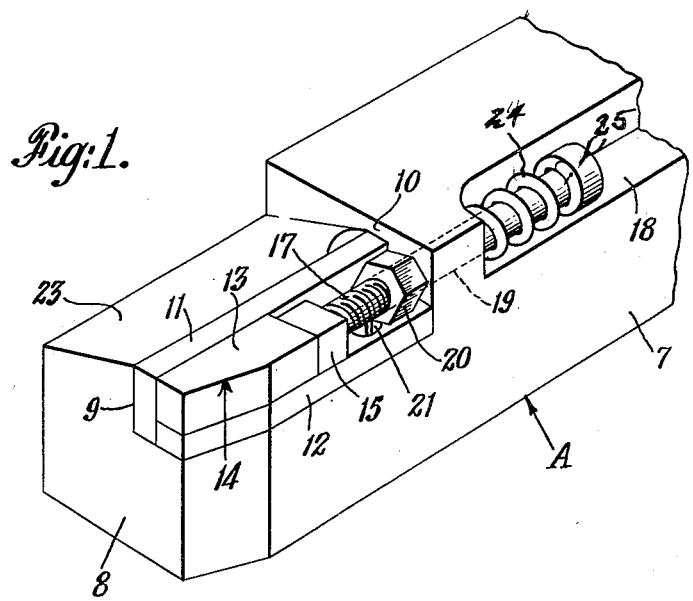
Fig:1.
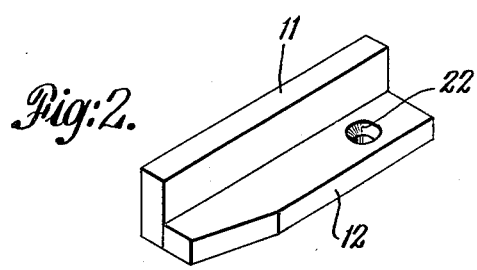
Fig:2.
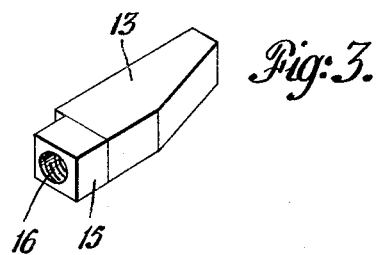
Fig:3.
INVENTOR
Barton E. Middleton
BY
ATTORNEYS Patented Apr. 29, 1952

UNITED STATES PATENT OFFICE 2,595,090

CUTTING TOOL

Burton E. Middleton, Hatfield, Pa., assignor to The Econotool Company, Jenkintown, Pa., a partnership composed of Burton E. Middleton, Hatfield, and Thomas W. Montgomery, Hatboro, Pa.

Application August 1, 1947, Serial No. 765,373

7 Claims. (Cl. 29—96)

This invention relates to cutting tools and more specifically to tools provided with detachable and replaceable tips for use in cutting various materials on lathes, boring mills, shapers, and the like.

Heretofore it has been the general practice in tools of this class to clamp or wedge or braze the tips in place.

One of the primary objects of the invention is to support the cutting tip in such manner as to eliminate such clamping or wedging or brazing, thus materially reducing the likelihood of breakage due to obstruction of normal chip flow by the clamp, which is most noticeable in the cutting of steel with heavy feeds and cuts, and to "back lash," i. e., reversal of exerted pressure upon stalling in a cut with the feed engaged.

It is a further object of the invention to provide a support such as to eliminate the additional width or length of the cutting tip required to provide adequate clamping or securing surface, and such that a maximum usable proportion of cutting tip is had before the tip must be discarded after resharpenings.

Still another object of the invention is to provide a support such that the use of a cutting tip of practical and economical shape, size and proportion, from the standpoint of metallurgical manufacture, is made possible.

A further object of the invention is to provide a support such that the use of a detachable reinforcing section, harder than the shank or holder and more capable of resisting "peening" and "mushrooming" from cutting pressure and heat, is made possible.

How the foregoing, together with such other objects and advantages as may hereinafter appear, or are incident to the invention are realized, is illustrated in the accompanying drawings, wherein—

Fig. 1 is a fragmentary perspective view of a tool holder and cutting tip embodying my invention, and Figs. 2 and 3 are views illustrating details of the invention.

Referring now to Fig. 1, the tool holder A is comprised of a shank portion 7 and a head 8. In the embodiment shown, the shank and head are substantially rectangular in section, but it is to be understood that the general configuration may vary, depending on the particular machine or service for which the tool is to be used. One corner of the head is cut away to provide a longitudinally extending cutting tip recess 9, such recess being desirably right angled. The recess extends from the work end of the tool back to the shoulder 10 of the shank. The side wall and bottom of the recess are faced with facings 11 and 12, preferably secured together in L-shape by brazing. The shank and head are preferably made of steel having a Rockwell C hardness of not less than approximately 45 and the facing is made of steel having a Rockwell C hardness of not less than approximately 60.

The cutting tip 13 which is preferably made of suitable hard material, such as tungsten carbide, cast alloy or high speed steel, is of relatively short length and has a lateral cutting edge or face 14 toward one end. At the other end there is a holding or supporting block 15 which is secured to the cutting tip by a frangible connection, such as a brazed connection in which desirably silver solder is used as the braze. The block has a threaded recess 16 to receive the end of an adjusting supporting or backing-up screw 17. A corner of the shank is provided with a recess 18 long enough to permit of the introduction thereinto of the screw. The shoulder portion 10 of the shank has an unthreaded hole 19 therethrough to receive the screw. Thus, when the screw is inserted in the recess 18, it may be advanced through said hole 19 and into the hole 16 in the block 15. The cutting tip is adjusted as by the nut 20 which is adapted to abut against the shoulder 10. The compression spring 24 between the shoulder 10 and the screw head 25, maintains the position of the screw and hence of the tip by maintaining the nut in engagement with the face of the shoulder so that the tool may be used in any position. Naturally the pressure from the work when the tool is in use acts to hold the nut against the shoulder.

The facing is held in place by means of the screw 21 for which purpose the hole 22 is provided in the member 12 of the facing.

It will also be seen from the foregoing that the cutting tip is supported by the side wall and bottom wall of the recess (more specifically by the facing members 11 and 12) under the cutting pressure.

If, now, there should be stalling in a cut with the feed engaged, the "back lash" due to the reversal of exerted pressure has no detrimental effect on any of the parts for the reason that if the back lash pressure is great, the frangible connection between the cutting tip and the supporting block will be broken. Thus there will be no distortion or breaking of the parts otherwise considered, and it is only necessary to re-braze the block in position whereupon the tip will occupy its proper relation to the other parts.

I prefer to have the upper surface 23 of the head slope downwardly away from the recess to provide for improved chip flow.

It will be seen from the foregoing that I avoid many of the disadvantages and complications incident to the use of clamps, wedges or brazing to secure the tip in place, while at the same time I secure advantages such as those hereinbefore pointed out.

I claim:

1. A cutting tool comprising a tool holder having a head and a shank portion, said head having an approximately right angled tip receiving recess extending longitudinally of the head along an edge thereof, a correspondingly angled cutting tip freely lying in said recess for longitudinal and lateral movement with respect thereto and adapted to be supported by the side wall and bottom wall of the recess under the thrust set up when the tool is in use, said tip having a cutting edge adjacent one end, a supporting block secured to the other end of the tip by a readily frangible connection, and an adjustable positioning member carried by the tool and coupled to said block.

2. The tool of claim 1 in which the positioning member is a screw and the block has a threaded screw receiving aperture.

3. The tool of claim 1 in which the positioning member is a screw provided with a nut and the block has a threaded screw receiving aperture and the shank has an unthreaded aperture for the screw.

4. The tool of claim 1 in which the positioning member is a screw and the block has a threaded screw receiving aperture and the shank has an unthreaded aperture for the screw and in which the screw is provided with a nut and a compression spring operating to hold the screw in positions of adjustment obtained by the nut.

5. The tool of claim 1 in which the positioning member is a screw and the block has a threaded screw receiving aperture and the shank has an aperture for the screw and in which the screw is provided with a nut, said screw and nut lying within the planes of the faces of the shank.

6. The tool of claim 1 in which the head is generally rectangular in cross section with the recess in a corner thereof with its top face sloping downwardly away from the recess.

7. The tool of claim 1 in which the positioning member is a screw and the block has a threaded screw receiving aperture and the shank has an unthreaded aperture for the screw and in which the screw is provided with a nut and a compression spring and in which the shank has a shoulder portion against which the nut is adapted to abut under the influence of the spring.

BURTON E. MIDDLETON.

REFERENCES CITED

The following references are of record in the file of this patent:

UNITED STATES PATENTS

| Number | Name | Date |
| --- | --- | --- |
| 1,212,271 | Smith | Jan. 16, 1917 |
| 2,341,314 | Clark | Feb. 8, 1944 |
| 2,370,273 | Ulliman | Feb. 27, 1945 |
| 2,395,570 | McKenna | Feb. 26, 1946 |